(12) United States Patent
Wenren et al.

(10) Patent No.: US 12,111,450 B2
(45) Date of Patent: Oct. 8, 2024

(54) CAMERA LENS ASSEMBLY (71) Applicant: ZHEJIANG SUNNY OPTICS CO., LTD., Yuyao Zhejiang (CN)

(72) Inventors: Jianke Wenren, Yuyao Zhejiang (CN); Fujian Dai, Yuyao Zhejiang (CN); Liefeng Zhao, Yuyao Zhejiang (CN)

(73) Assignee: ZHEJIANG SUNNY OPTICS CO., LTD., Yuyao Zhejiang (CN)

( * ) Notice: Subject to any disclaimer, the term of this patent is extended or adjusted under 35 U.S.C. 154(b) by 498 days.

(21) Appl. No.: 17/555,900

(22) Filed: Dec. 20, 2021

(65) Prior Publication Data

US 2022/0236532 A1 Jul. 28, 2022

(30) Foreign Application Priority Data

Jan. 25, 2021 (CN) .......................... 202110097158.5

(51) Int. Cl.
*G02B 13/00* (2006.01)
*G02B 9/64* (2006.01)
*G02B 27/00* (2006.01)

(52) U.S. Cl.
CPC ........... *G02B 13/0045* (2013.01); *G02B 9/64* (2013.01); *G02B 27/0025* (2013.01)

(58) Field of Classification Search
CPC .. G02B 13/0045; G02B 9/64; G02B 27/0025; G02B 13/06; G02B 13/16; G02B 13/18
See application file for complete search history.

(56) References Cited

U.S. PATENT DOCUMENTS

2019/0243107 A1* 8/2019 Hsu ..................... G02B 13/0045

FOREIGN PATENT DOCUMENTS

| CN | 106324811 A | | 1/2017 | |
|---|---|---|---|---|
| CN | 110646921 A | * | 1/2020 | ......... G02B 13/0015 |
| CN | 111025566 A | | 4/2020 | |
| CN | 111077635 A | | 4/2020 | |

* cited by examiner

*Primary Examiner* — Collin X Beatty
(74) *Attorney, Agent, or Firm* — Norris McLaughlin, P.A.

(57) ABSTRACT

The present disclosure provides a camera lens assembly, which includes, sequentially from an object side to an image side along an optical axis, a first lens having a refractive power with a convex object-side surface; a second lens having a refractive power with a convex object-side surface; a third lens having a positive refractive power; a fourth lens having a negative refractive power and a concave object-side surface; a fifth lens having a refractive power; and a sixth lens having a refractive power. A half of a maximal field-of-view Semi-FOV of the camera lens assembly satisfies: Semi-FOV≥70°. A half of a diagonal length ImgH of an effective pixel area on the imaging plane of the camera lens assembly satisfies: ImgH≥7.8 mm.

14 Claims, 6 Drawing Sheets

CAMERA LENS ASSEMBLY

CROSS-REFERENCE TO RELATED APPLICATIONS

This application claims benefit of priority to Chinese Patent Application No. 202110097158.5 filed on Jan. 25, 2021 before the China National Intellectual Property Administration, the entire disclosure of which is incorporated herein by reference in its entity.

TECHNICAL FIELD

The present disclosure relates to the field of optical elements, and more specifically, relates to a camera lens assembly.

BACKGROUND

In recent years, portable electronic products with camera functions have gradually emerged. Lens assemblies are used as an important part of camera systems, and their imaging qualities have received more and more attention.

With the rapid development of camera systems for portable electronic products, higher requirements are set for camera lens assemblies. In order to provide users with high-quality camera functions in an all-round way, large field-of-view camera lens assemblies with higher imaging qualities have become a trend in lens assembly development. Wide-angle lens assemblies have the characteristics of large field-of-view and long depth of field, which can easily bring a sense of perspective to photographers and enhance the appeal of pictures. However, the wide-angle lens assemblies usually have imaging quality problems such as large vertical chromatic aberrations, resulting in poor imaging effects. How to achieve the ultra wide-angles of the lens assemblies while improving the image qualities is one of the urgent problems to be solved in the lens assembly field.

SUMMARY

The present disclosure provides a camera lens assembly, which may include, sequentially from an object side to an image side along an optical axis, a first lens having a negative refractive power and a convex object-side surface; a second lens having a positive refractive power; a third lens; a fourth lens having a positive refractive power; a fifth lens having a negative refractive power; a sixth lens having a positive refractive power, and a seventh lens. An axial distance TTL from the object-side surface of the first lens to an imaging plane of the camera lens assembly and a maximal field-of-view FOV of the camera lens assembly may satisfy: 7.0 mm<TTL/Tan(FOV/3)<8.0 mm. An effective focal length f3 of the third lens and a total effective focal length f of the camera lens assembly may satisfy: $-2.0<f3/f<-1.0$.

In some embodiments, the total effective focal length f of the camera lens assembly and an effective focal length f4 of the fourth lens may satisfy: $1\leq f/f4<1.5$.

In some embodiments, an effective focal length f6 of the sixth lens and an effective focal length f4 of the fourth lens may satisfy: $1.5<f6/f4<2.5$.

In some embodiments, the effective focal length f3 of the third lens and an effective focal length f1 of the first lens may satisfy: $1.0<f3/f1<1.5$.

In some embodiments, the total effective focal length f of the camera lens assembly and a spaced interval T67 between the sixth lens and the seventh lens on the optical axis may satisfy: $0.9<f/T67<1.2$.

In some embodiments, an axial center thickness CT6 of the sixth lens and an axial center thickness CT4 of the fourth lens may satisfy: $1.0<CT6/CT4<1.5$.

In some embodiments, a radius of curvature R11 of an object-side surface of the sixth lens, a radius of curvature R12 of an image-side surface of the sixth lens and an axial center thickness CT6 of the sixth lens may satisfy: $1<(R11+R12)/CT6<1.5$.

In some embodiments, an effective focal length f5 of the fifth lens, a radius of curvature R9 of an object-side surface of the fifth lens and a radius of curvature R10 of an image-side surface of the fifth lens may satisfy: $-4.0<f5/(R9-R10)<-3.0$.

In some embodiments, an effective focal length f2 of the second lens, a radius of curvature R3 of an object-side surface of the second lens and a radius of curvature R2 of an image-side surface of the first lens may satisfy: $2.0<f2/(R3-R2)<3.0$.

In some embodiments, the total effective focal length f of the camera lens assembly, a radius of curvature R1 of the object-side surface of the first lens and a radius of curvature R2 of an image-side surface of the first lens may satisfy: $0.5\leq f/(R1-R2)<1.1$.

In some embodiments, a radius of curvature R5 of an object-side surface of the third lens and a radius of curvature R6 of an image-side surface of the third lens may satisfy: $-1.5<R5/R6<-0.5$.

In some embodiments, the total effective focal length f of the camera lens assembly and a radius of curvature R8 of an image-side surface of the fourth lens may satisfy: $-2.0<f/R8\leq-1.5$.

In some embodiments, the camera lens assembly further includes a stop, and an axial distance Tsi from the stop to the imaging plane of the camera lens assembly and a half of a diagonal length ImgH of an effective pixel area on the imaging plane may satisfy: $1.5<Tsi/ImgH<3.0$.

In another aspect, the present disclosure provides a camera lens assembly, which may include, sequentially from an object side to an image side along an optical axis, a first lens having a negative refractive power and a convex object-side surface; a second lens having a positive refractive power; a third lens; a fourth lens having a positive refractive power; a fifth lens having a negative refractive power; a sixth lens having a positive refractive power, and a seventh lens. An axial distance TTL from the object-side surface of the first lens to an imaging plane of the camera lens assembly and a maximal field-of-view FOV of the camera lens assembly may satisfy: 7.0 mm<TTL/Tan(FOV/3)<8.0 mm. An effective focal length f2 of the second lens, a radius of curvature R3 of an object-side surface of the second lens and a radius of curvature R2 of an image-side surface of the first lens may satisfy: $2.0<f2/(R3-R2)<3.0$.

In some embodiments, a total effective focal length f of the camera lens assembly and an effective focal length f4 of the fourth lens may satisfy: $1\leq f/f4<1.5$.

In some embodiments, an effective focal length f6 of the sixth lens and an effective focal length f4 of the fourth lens may satisfy: $1.5<f6/f4<2.5$.

In some embodiments, an effective focal length f3 of the third lens and an effective focal length f1 of the first lens may satisfy: $1.0<f3/f1<1.5$.

In some embodiments, an effective focal length f3 of the third lens and a total effective focal length f of the camera lens assembly may satisfy: $-2.0<f3/f<-1.0$.

In some embodiments, a total effective focal length f of the camera lens assembly and a spaced interval T67 between the sixth lens and the seventh lens on the optical axis may satisfy: $0.9<f/T67<1.2$.

In some embodiments, an axial center thickness CT6 of the sixth lens and an axial center thickness CT4 of the fourth lens may satisfy: $1.0<CT6/CT4<1.5$.

In some embodiments, a radius of curvature R11 of an object-side surface of the sixth lens, a radius of curvature R12 of an image-side surface of the sixth lens and an axial center thickness CT6 of the sixth lens may satisfy: $1<(R11+R12)/CT6<1.5$.

In some embodiments, an effective focal length f5 of the fifth lens, a radius of curvature R9 of an object-side surface of the fifth lens and a radius of curvature R10 of an image-side surface of the fifth lens may satisfy: $-4.0<f5/(R9-R10)<-3.0$.

In some embodiments, a total effective focal length f of the camera lens assembly, a radius of curvature R1 of the object-side surface of the first lens and the radius of curvature R2 of the image-side surface of the first lens may satisfy: $0.5 \le f/(R1-R2)<1.1$.

In some embodiments, a radius of curvature R5 of an object-side surface of the third lens and a radius of curvature R6 of an image-side surface of the third lens may satisfy: $-1.5<R5/R6<-0.5$.

In some embodiments, a total effective focal length f of the camera lens assembly and a radius of curvature R8 of an image-side surface of the fourth lens may satisfy: $-2.0<f/R8<-1.5$.

In some embodiments, the camera lens assembly further includes a stop, and an axial distance Tsi from the stop to the imaging plane of the camera lens assembly and a half of a diagonal length ImgH of an effective pixel area on the imaging plane may satisfy: $1.5<Tsi/ImgH<3.0$.

The present disclosure adopts a seven-piece lens assembly structure. By reasonably distributing the refractive power, surface type, center thickness of each lens and the axial distances between the lenses, the camera lens assembly has at least one of the beneficial effects of a large filed-of-view and a high imaging quality.

BRIEF DESCRIPTION OF THE DRAWINGS

Other features, objects, and advantages of the present disclosure will become more apparent from the following detailed description of non-limiting embodiments, taken in conjunction with the accompanying drawings. In the drawings.

DETAILED DESCRIPTION OF EMBODIMENTS

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, without departing from the teachings of the present disclosure, a first lens discussed below may also be referred to as a second lens or a third lens.

In the accompanying drawings, the thickness, size and shape of the lens have been somewhat exaggerated for the convenience of explanation. In particular, shapes of spherical surfaces or aspherical surfaces shown in the accompanying drawings are shown by way of example. That is, shapes of the spherical surfaces or the aspherical surfaces are not limited to the shapes of the spherical surfaces or the aspherical surfaces shown in the accompanying drawings. The accompanying drawings are merely illustrative and not strictly drawn to scale.

Herein, the paraxial area refers to an area near the optical axis. If a surface of a lens is a convex surface and the position of the convex surface is not defined, it indicates that the surface of the lens is convex at least in the paraxial region. If a surface of a lens is a concave surface and the position of the concave surface is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

A camera lens assembly according to an exemplary embodiment of the present disclosure may include, for example, seven lenses having refractive powers, which are a first lens, a second lens, a third lens, a fourth lens, a fifth lens, a sixth lens, and a seventh lens respectively. The seven lenses are sequentially arranged from an object side to an image side along an optical axis of the camera lens assembly. Among the first lens to the seventh lens, there may be a spaced interval between any two adjacent lenses.

In an exemplary embodiment, the first lens may have a negative refractive power; the second lens may have a positive refractive power; the third lens may have a positive or negative refractive power; the fourth lens may have a positive refractive power; the fifth lens may have a negative refractive power; the sixth lens may have a positive refractive power; and the seventh lens may have a positive or negative refractive power. By reasonably distributing the positive or negative refractive power of each lens of the camera lens assembly, the imaging quality of the camera lens assembly can be effectively improved.

In an exemplary embodiment, the camera lens assembly of the present disclosure may satisfy: 7.0 mm<TTL/Tan(FOV/3)<8.0 mm, where TTL is an axial distance from the object-side surface of the first lens to an imaging plane of the camera lens assembly and FOV is a maximal field-of-view of the camera lens assembly. By constraining TTL and FOV, the camera lens assembly can have a greater degree of freedom, and at the same time, it is conducive for the camera lens assembly to have a larger field-of-view. More specifically, TTL and FOV may satisfy: 7.40 mm<TTL/Tan(FOV/3)<7.80 mm.

In an exemplary embodiment, the camera lens assembly of the present disclosure may satisfy: −2.0<f3/f<−1.0, where f3 is an effective focal length of the third lens and f is a total effective focal length of the camera lens assembly. By reasonably controlling the refractive power of the third lens, the third lens has a reasonable negative refractive power, which is conducive to reducing the sensitivity of the third lens. More specifically, f3 and f may satisfy: −1.95<f3/f<−1.40.

In an exemplary embodiment, the camera lens assembly of the present disclosure may satisfy: 1≤f/f4<1.5, where f is a total effective focal length of the camera lens assembly and f4 is an effective focal length of the fourth lens. The camera lens assembly satisfies: 1≤f/f4<1.5, which can avoid the problem of increased sensitivity caused by an excessive refractive power of the fourth lens, and can also improve the uniformity of the fourth lens. More specifically, f and f4 may satisfy: 1.10<f/f4<1.20.

In an exemplary embodiment, the camera lens assembly of the present disclosure may satisfy: 1.5<f6/f4<2.5, where f6 is an effective focal length of the sixth lens and f4 is an effective focal length of the fourth lens. The camera lens assembly satisfies: 1.5<f6/f4<2.5, so that the camera lens assembly has a better function of balancing a chromatic aberration and reducing a distortion. More specifically, f6 and f4 may satisfy: 1.70<f6/f4<2.10.

In an exemplary embodiment, the camera lens assembly of the present disclosure may satisfy: 1.0<f3/f1<1.5, where f3 is an effective focal length of the third lens and f1 is an effective focal length of the first lens. The camera lens assembly satisfies: 1.0<f3/f1<1.5, which can effectively increase the field-of-view of the camera lens assembly and reduce the optical distortion on the image side. More specifically, f3 and f1 may satisfy: 1.05<f3/f<1.20.

In an exemplary embodiment, the camera lens assembly of the present disclosure may satisfy: 0.9<f/T67<1.2, where f is a total effective focal length of the camera lens assembly and T67 is a spaced interval between the sixth lens and the seventh lens on the optical axis. The camera lens assembly satisfies: 0.9<f/T67<1.2, so that the sixth lens has a reasonable refractive power, which is conducive to correcting aberrations of the camera lens assembly. More specifically, f and T67 may satisfy: 0.95<f/T67<1.10.

In an exemplary embodiment, the camera lens assembly of the present disclosure may satisfy: 1.0<CT6/CT4<1.5, where CT6 is an axial center thickness of the sixth lens and CT4 is an axial center thickness of the fourth lens. The camera lens assembly satisfies: 1.0<CT6/CT4<1.5, so that the size of the camera lens assembly can be effectively controlled, which is conducive to realizing the miniaturization of the camera lens assembly. More specifically, CT6 and CT4 may satisfy: 1.10<CT6/CT4<1.40.

In an exemplary embodiment, the camera lens assembly of the present disclosure may satisfy: 1<(R11+R12)/CT6<1.5, where R11 is a radius of curvature of an object-side surface of the sixth lens, R12 is a radius of curvature of an image-side surface of the sixth lens and CT6 is an axial center thickness of the sixth lens. The camera lens assembly satisfies: 1<(R11+R12)/CT6<1.5, which can ensure that the camera lens assembly has a high relative illumination. More specifically, R11, R12 and CT6 may satisfy 1.10<(R11+R12)/CT6<1.40.

In an exemplary embodiment, the camera lens assembly of the present disclosure may satisfy: −4.0<f5/(R9−R10)<−3.0, where f5 is an effective focal length of the fifth lens, R9 is a radius of curvature of an object-side surface of the fifth lens and R10 is a radius of curvature of an image-side surface of the fifth lens. The camera lens assembly satisfies: −4.0<f5/(R9−R10)<−3.0, so that the size of the rear end of the camera lens assembly can be effectively reduced to avoid the camera lens assembly from being too large, which is conducive to realizing the miniaturization of the camera lens assembly. More specifically, f5, R9 and R10 may satisfy: −3.85<f5/(R9−10)<−3.0.

In an exemplary embodiment, the camera lens assembly of the present disclosure may satisfy: 2.0<f2/(R3−R2)<3.0, where f2 is an effective focal length of the second lens, R3 is a radius of curvature of an object-side surface of the second lens and R2 is a radius of curvature of an image-side surface of the first lens. The camera lens assembly satisfies: 2.0<f2/(R3−R2)<3.0, so that the camera lens assembly has a small vertical chromatic aberration. More specifically, f2, R3 and R2 may satisfy: 2.30<f2/(R3−R2)<2.60.

In an exemplary embodiment, the camera lens assembly of the present disclosure may satisfy: 0.5≤f/(R1−R2)<1.1, where f is a total effective focal length of the camera lens assembly, R1 is a radius of curvature of an object-side surface of the first lens and R2 is a radius of curvature of an image-side surface of the first lens. The camera lens assembly satisfies: 0.5≤f/(R1−R2)<1.1, which can reduce the sensitivity of the first lens and at the same time enable the camera lens assembly to have a larger field-of-view. More specifically, f, R1 and R2 may satisfy: 0.55<f/(R1−R2)<1.05.

In an exemplary embodiment, the camera lens assembly of the present disclosure may satisfy: −1.5<R5/R6<−0.5, where R5 is a radius of curvature of an object-side surface of the third lens and R6 is a radius of curvature of an image-side surface of the third lens. The camera lens assembly satisfies: −1.5<R5/R6<−0.5, so that the camera lens assembly has a smaller axial chromatic aberration, which is conducive to improving the imaging quality of the camera lens assembly. More specifically, R5 and R6 may satisfy: −1.10<R5/R6<−0.70.

In an exemplary embodiment, the camera lens assembly of the present disclosure may satisfy: −2.0<f/R8≤−1.5, where f is a total effective focal length of the camera lens assembly and R8 is a radius of curvature of an image-side surface of the fourth lens. The camera lens assembly satisfies: −2.0<f/R8≤−1.5, which helps the camera lens assembly to have a smooth transition of an optical distortion on the basis of a large field-of-view, so as to improving the imaging quality of the camera lens assembly. More specifically, f and R8 may satisfy: −1.70<f/R8<−1.50.

In an exemplary embodiment, the camera lens assembly of the present disclosure may further include a stop, which may be disposed at an appropriate position as needed, for example, may be disposed between the third lens and the fourth lens. The camera lens assembly of the present disclosure may satisfy: 1.5<Tsi/ImgH<3.0, where Tsi is a spaced interval from the stop to the imaging plane of the camera lens assembly on the optical axis and ImgH is a half of a diagonal length of an effective pixel area on the imaging plane of the camera lens assembly. The camera lens assembly satisfies: 1.5<Tsi/ImgH<3.0, so that the overall size of the camera lens assembly can be effectively reduced, which is conducive to realizing the miniaturization of the camera lens assembly. More specifically, Tsi and ImgH may satisfy: 1.80<Tsi/ImgH<2.90.

In an exemplary embodiment, the camera lens assembly may further include an optical filter for correcting the color deviation and/or a protective glass for protecting the photosensitive element on the imaging plane.

The camera lens assembly according to the above embodiments of the present disclosure may adopt multiple lenses, for example, the above seven lenses. By reasonably distributing the refractive power, surface type, center thickness of each lens and the axial distances between the lenses, the size and sensitivity of the camera lens assembly can be effectively reduced and the processability of a group of camera lenses can be effectively improved, which is conducive for the camera lens assembly to be produced and processed and be suitable for portable electronic products. The camera lens assembly according to the embodiments of the present disclosure can have an ultra-wide-angle while improving an imaging quality.

In the embodiments of the present disclosure, at least one of the surfaces of the lenses is an aspherical lens, that is, at least one of the surfaces from the object-side surface of the first lens to the image-side surface of the seventh lens is an aspheric surface. An Aspheric lens is characterized by a continuous change in curvature from the center of the lens to the periphery of the lens. Unlike a spherical lens, which has a constant curvature from the center of the lens to the periphery of the lens, an aspheric lens has better characteristics about radius of curvature and has the advantages of improving a distortion and an astigmatic aberration. With the aspheric lens, aberrations occurring during imaging can be eliminated as much as possible, thereby improving the imaging quality. Alternatively, at least one of the object-side surfaces and the image-side surfaces of the first lens, the second lens, the third lens, the fourth lens, the fifth lens, the sixth lens, and the seventh lens is an aspheric surface. Alternatively, all of the object-side surfaces and the image-side surfaces of the first lens, the second lens, the third lens, the fourth lens, the fifth lens, the sixth lens, and the seventh lens are aspheric surfaces.

However, it will be understood by those skilled in the art that the number of lenses constituting the camera lens assembly may be varied to achieve the various results and advantages described herein without departing from the technical solutions claimed by the present disclosure. For example, although some embodiments are described by taking seven lenses as an example, the camera lens assembly is not limited to include seven lenses. The camera lens assembly may alternatively include other numbers of lenses as needed.

Some specific examples of a camera lens assembly applicable to the above embodiments will be further described below with reference to the accompanying drawings.

Example 1

Figure 1:
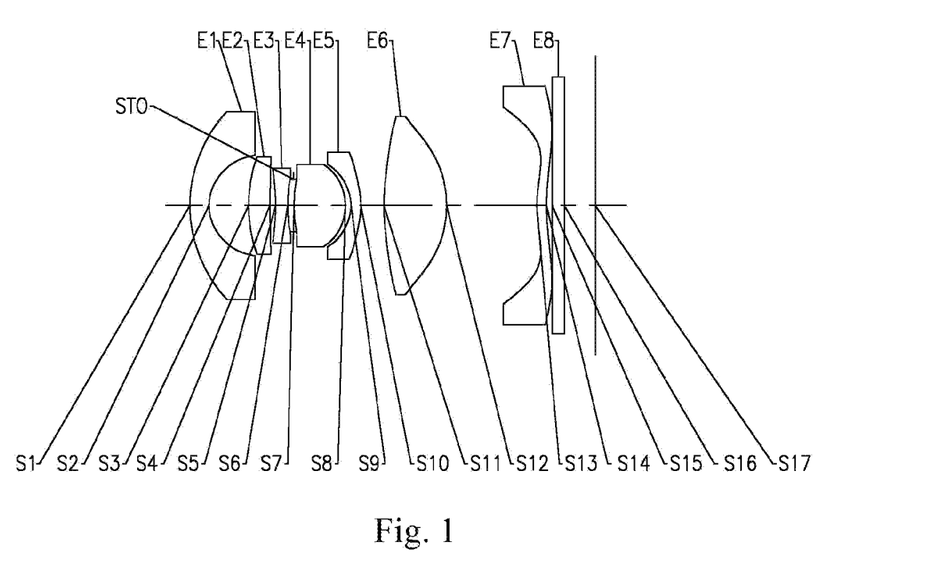
FIG. 1 is a schematic structural diagram showing a camera lens assembly according to Example 1 of the present disclosure.

A camera lens assembly according to example 1 of the present disclosure is described below with reference to FIGS. 1 to 2D. FIG. 1 shows a schematic structural diagram of the camera lens assembly according to example 1 of the present disclosure.

As shown in FIG. 1, the camera lens assembly includes a first lens E1, a second lens E2, a third lens E3, a stop STO, a fourth lens E4, a fifth lens E5, a sixth lens E6, a seventh lens E7, and an optical filter E8, which are sequentially arranged along an optical axis from an object side to an image side of the camera lens assembly.

The first lens E1 has a negative refractive power, and an object-side surface S1 thereof is a convex surface and an image-side surface S2 thereof is a concave surface. The second lens E2 has a positive refractive power, and an object-side surface S3 thereof is a convex surface and an image-side surface S4 thereof is a concave surface. The third lens E3 has a negative refractive power, and an object-side surface S5 thereof is a concave surface and an image-side surface S6 thereof is a concave surface. The fourth lens E4 has a positive refractive power, and an object-side surface S7 thereof is a convex surface and an image-side surface S8 thereof is a convex surface. The fifth lens E5 has a negative refractive power, and an object-side surface S9 thereof is a concave surface and an image-side surface S10 thereof is a convex surface. The sixth lens E6 has a positive refractive power, and an object-side surface S11 thereof is a convex surface and an image-side surface S12 thereof is a convex surface. The seventh lens E7 has a positive refractive power, and an object-side surface S13 thereof is a convex surface and an image-side surface S14 thereof is a concave surface. The optical filter E8 has an object-side surface S15 and an image-side surface S16. The camera lens assembly has an imaging plane S17. Light from an object sequentially passes through the respective surfaces S1 to S16 and is finally imaged on the imaging plane S17.

Table 1 shows basic parameters of the camera lens assembly of example 1, where the units for the radius of curvature, the thickness and the focal length are millimeter (mm).

TABLE 1

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | 2.2700 | 0.3348 | 1.546 | 56.09 | −2.42 | 0.000 |
| S2 | Aspheric | 0.7926 | 0.6918 | | | | −1.000 |
| S3 | Aspheric | 2.7940 | 0.3704 | 1.677 | 19.24 | 5.08 | 0.000 |
| S4 | Aspheric | 14.0643 | 0.1000 | | | | 0.000 |
| S5 | Aspheric | −3.0136 | 0.2100 | 1.537 | 55.71 | −2.85 | 0.000 |
| S6 | Aspheric | 3.1867 | 0.1000 | | | | 0.000 |
| STO | Spherical | Infinite | 0.0100 | | | | |
| S7 | Aspheric | 2.4425 | 0.8947 | 1.546 | 56.09 | 1.32 | 0.000 |
| S8 | Aspheric | −0.8911 | 0.1000 | | | | 0.000 |
| S9 | Aspheric | −0.6751 | 0.1700 | 1.677 | 19.24 | −2.17 | −1.000 |
| S10 | Aspheric | −1.3772 | 0.4020 | | | | 0.000 |
| S11 | Aspheric | 3.5076 | 1.0918 | 1.537 | 55.71 | 2.56 | 0.000 |
| S12 | Aspheric | −2.0065 | 1.5710 | | | | 0.000 |
| S13 | Aspheric | 2.0740 | 0.1700 | 1.537 | 55.71 | 7.48 | 0.000 |
| S14 | Aspheric | 4.1669 | 0.1000 | | | | 0.000 |
| S15 | Spherical | Infinite | 0.2100 | 1.518 | 64.17 | | |
| S16 | Spherical | Infinite | 0.5400 | | | | |
| S17 | Spherical | Infinite | | | | | |

In example 1, the total effective focal length f of the camera lens assembly is 1.50 mm, the axial distance TTL from the object-side surface S1 of the first lens E1 to the imaging plane S17 is 7.07 mm, and the maximal field-of-view FOV is 130.0°.

In example 1, the object-side surface and the image-side surface of each one of the first lens E1 to the seventh lens E7 are both aspheric. The surface type x of each aspheric lens may be defined by using, but not limited to, the following aspheric formula:

$$x = \frac{ch^2}{1 + \sqrt{1 - (k+1)c^2h^2}} + \sum A_i h^i \quad (1)$$

where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2 below shows high-order coefficients A4, A6, A8, A10, A12, A14, A16, A18, A20, A22, A24, A26, A28 and A30 applicable to each aspheric surface S1 to S14 in example 1.

TABLE 2

| Surface number | A4 | A6 | A8 | A10 | A12 | A14 | A16 |
|---|---|---|---|---|---|---|---|
| S1 | −6.1103E−02 | 6.0294E−03 | −7.4745E−04 | −5.5857E−06 | −4.5038E−06 | −6.4369E−07 | 0.0000E+00 |
| S2 | 2.0149E−01 | 5.8550E−02 | 2.3846E−02 | 1.2279E−02 | 6.5307E−03 | 3.8721E−03 | 2.3366E−03 |
| S3 | 4.2441E−02 | −1.0641E−03 | −1.7441E−04 | 1.0557E−03 | −1.5477E−04 | 4.5315E−06 | 4.7869E−06 |
| S4 | −2.9457E−03 | −2.3625E−03 | 6.7672E−04 | −1.3647E−04 | −1.9701E−05 | 2.7491E−08 | 6.7518E−06 |
| S5 | 4.7640E−02 | −5.1925E−03 | 8.5020E−04 | −6.2514E−04 | 4.3953E−04 | −2.1068E−04 | 4.2480E−05 |
| S6 | 1.9897E−02 | 6.3900E−04 | −4.5363E−04 | −4.1503E−04 | 1.0375E−05 | 7.5063E−05 | 5.8349E−07 |
| S7 | −3.2950E−03 | 8.4301E−03 | −1.7310E−03 | −5.9727E−04 | 2.8365E−04 | 7.2950E−05 | −5.4818E−05 |
| S8 | −4.1304E−02 | −1.8428E−02 | −2.9775E−03 | −3.3795E−03 | −1.6268E−03 | −8.6240E−04 | −4.6615E−04 |
| S9 | −8.3525E−03 | −3.4136E−02 | −6.0833E−04 | −7.4533E−04 | −1.6911E−04 | −1.2237E−04 | 2.0401E−05 |
| S10 | 2.4245E−01 | −3.4317E−02 | 7.0161E−03 | −8.6470E−04 | −1.4008E−05 | 6.7311E−07 | 6.2125E−07 |
| S11 | −1.5637E−01 | 3.0078E−02 | −5.2156E−03 | 1.8225E−03 | −4.5564E−04 | 1.4400E−04 | −2.1134E−05 |
| S12 | −5.0568E−02 | 3.2793E−02 | 2.2632E−03 | 1.0855E−03 | 1.3331E−04 | 2.2386E−05 | 7.2288E−06 |
| S13 | −1.8787E+00 | 1.2971E−01 | 4.7425E−03 | −9.7474E−03 | −1.9283E−03 | 1.2845E−03 | −3.7535E−04 |
| S14 | −1.1782E+00 | 1.7227E−01 | −5.0332E−03 | −5.6976E−03 | −7.9457E−06 | −1.7046E−07 | −1.5115E−08 |

| Surface number | A18 | A20 | A22 | A24 | A26 | A28 | A30 |
|---|---|---|---|---|---|---|---|
| S1 | 0.0000E+00 | 0.0000E+00 | 0.0000E+00 | 0.0000E+00 | 0.0000E+00 | 0.0000E+00 | 0.0000E+00 |
| S2 | 1.3957E−03 | 8.5965E−04 | 5.0116E−04 | 2.9685E−04 | 1.5298E−04 | 7.2815E−05 | 1.0347E−05 |
| S3 | 0.0000E+00 | 0.0000E+00 | 0.0000E+00 | 0.0000E+00 | 0.0000E+00 | 0.0000E+00 | 0.0000E+00 |
| S4 | 0.0000E+00 | 0.0000E+00 | 0.0000E+00 | 0.0000E+00 | 0.0000E+00 | 0.0000E+00 | 0.0000E+00 |
| S5 | 0.0000E+00 | 0.0000E+00 | 0.0000E+00 | 0.0000E+00 | 0.0000E+00 | 0.0000E+00 | 0.0000E+00 |
| S6 | 0.0000E+00 | 0.0000E+00 | 0.0000E+00 | 0.0000E+00 | 0.0000E+00 | 0.0000E+00 | 0.0000E+00 |
| S7 | 0.0000E+00 | 0.0000E+00 | 0.0000E+00 | 0.0000E+00 | 0.0000E+00 | 0.0000E+00 | 0.0000E+00 |

TABLE 2-continued

| S8 | −2.5402E−04 | −1.3860E−04 | −7.5183E−05 | −4.0142E−05 | −2.0699E−05 | −1.0119E−05 | −3.7920E−06 |
|---|---|---|---|---|---|---|---|
| S9 | 0.0000E+00 | 0.0000E+00 | 0.0000E+00 | 0.0000E+00 | 0.0000E+00 | 0.0000E+00 | 0.0000E+00 |
| S10 | 0.0000E+00 | 0.0000E+00 | 0.0000E+00 | 0.0000E+00 | 0.0000E+00 | 0.0000E+00 | 0.0000E+00 |
| S11 | 0.0000E+00 | 0.0000E+00 | 0.0000E+00 | 0.0000E+00 | 0.0000E+00 | 0.0000E+00 | 0.0000E+00 |
| S12 | 0.0000E+00 | 0.0000E+00 | 0.0000E+00 | 0.0000E+00 | 0.0000E+00 | 0.0000E+00 | 0.0000E+00 |
| S13 | 0.0000E+00 | 0.0000E+00 | 0.0000E+00 | 0.0000E+00 | 0.0000E+00 | 0.0000E+00 | 0.0000E+00 |
| S14 | 0.0000E+00 | 0.0000E+00 | 0.0000E+00 | 0.0000E+00 | 0.0000E+00 | 0.0000E+00 | 0.0000E+00 |

Figure 2A:
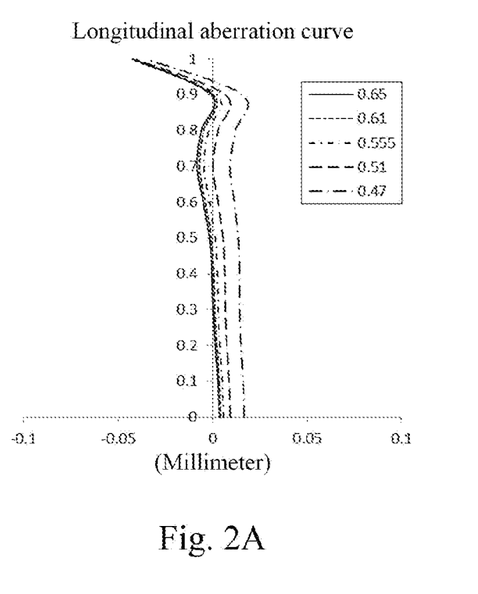
FIGS. 2A to 2D illustrate a longitudinal aberration curve, an astigmatic curve, a distortion curve, and a lateral color curve of the camera lens assembly of Example 1, respectively.
Figure 2B:
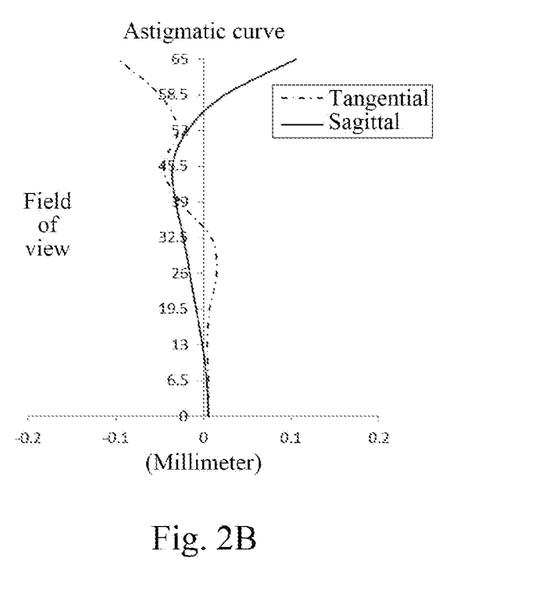
Figure 2C:
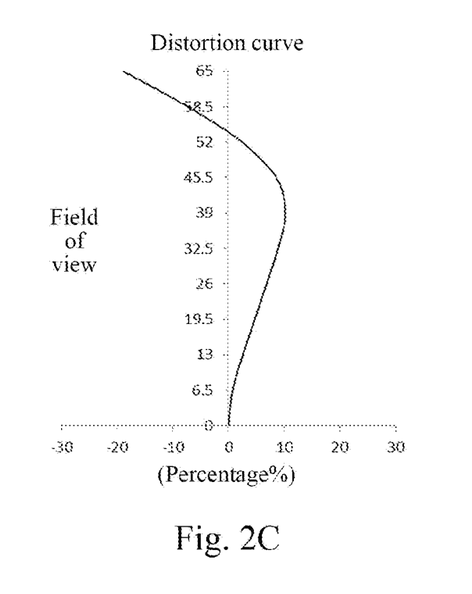
Figure 2D:
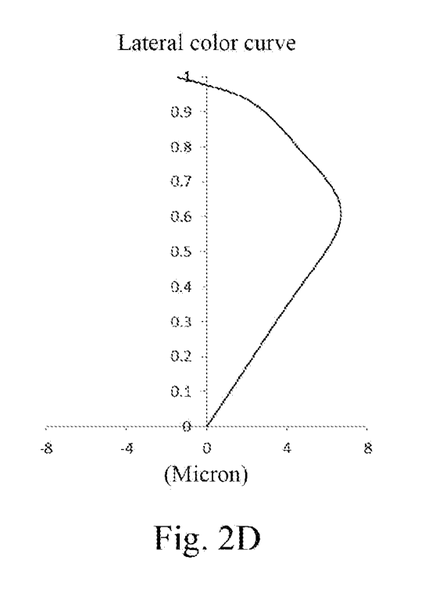

FIG. 2A illustrates a longitudinal aberration curve of the camera lens assembly according to example 1, representing deviations of focal points converged by lights of different wavelengths which pass through the lens assembly. FIG. 2B illustrates an astigmatic curve of the camera lens assembly according to example 1, representing a curvature of a tangential plane and a curvature of a sagittal plane. FIG. 2C illustrates a distortion curve of the camera lens assembly according to example 1, representing amounts of distortion corresponding to different field-of-views. FIG. 2D illustrates a lateral color curve of the camera imaging system according to example 1, representing deviations of different heights of images on an imaging plane formed by light passing through the lens assembly. It can be seen from FIG. 2A to FIG. 2D that the camera lens assembly provided in example 1 may achieve a good imaging quality.

Example 2

Figure 3:
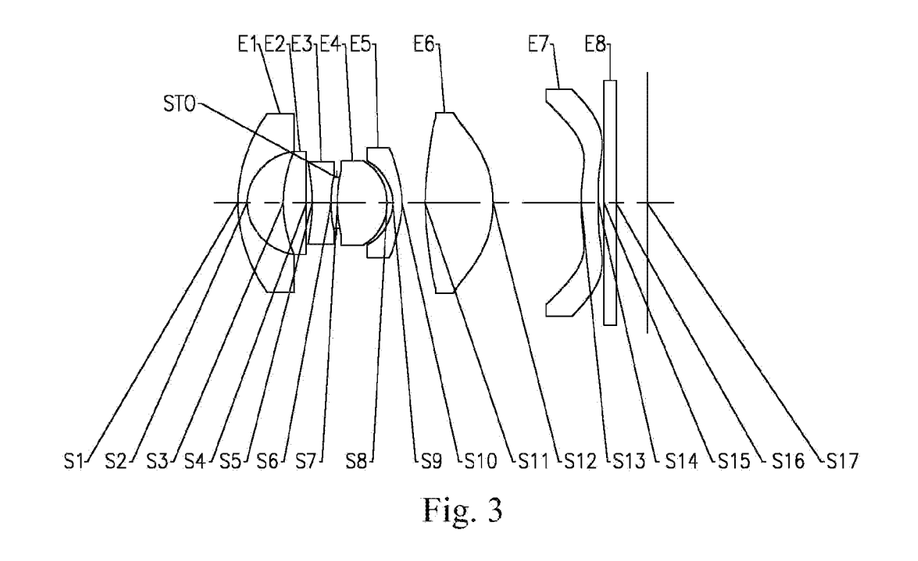
FIG. 3 is a schematic structural diagram showing a camera lens assembly according to Example 2 of the present disclosure.

A camera lens assembly according to example 2 of the present disclosure is described below with reference to FIGS. 3 to 4D. In this example and the following examples, for brevity, the description of parts similar to those in example 1 will be omitted. FIG. 3 shows a schematic structural diagram of the camera lens assembly according to example 2 of the present disclosure.

As shown in FIG. 3, the camera lens assembly includes a first lens E1, a second lens E2, a third lens E3, a stop STO, a fourth lens E4, a fifth lens E5, a sixth lens E6, a seventh lens E7, and an optical filter E8, which are sequentially arranged along an optical axis from an object side to an image side of the camera lens assembly.

The first lens E1 has a negative refractive power, and an object-side surface S1 thereof is a convex surface and an image-side surface S2 thereof is a concave surface. The second lens E2 has a positive refractive power, and an object-side surface S3 thereof is a convex surface and an image-side surface S4 thereof is a concave surface. The third lens E3 has a negative refractive power, and an object-side surface S5 thereof is a concave surface and an image-side surface S6 thereof is a concave surface. The fourth lens E4 has a positive refractive power, and an object-side surface S7 thereof is a convex surface and an image-side surface S8 thereof is a convex surface. The fifth lens E5 has a negative refractive power, and an object-side surface S9 thereof is a concave surface and an image-side surface S10 thereof is a convex surface. The sixth lens E6 has a positive refractive power, and an object-side surface S11 thereof is a convex surface and an image-side surface S12 thereof is a convex surface. The seventh lens E7 has a positive refractive power, and an object-side surface S13 thereof is a convex surface and an image-side surface S14 thereof is a convex surface. The optical filter E8 has an object-side surface S15 and an image-side surface S16. The camera lens assembly has an imaging plane S17. Light from an object sequentially passes through the respective surfaces S1 to S16 and is finally imaged on the imaging plane S17.

In example 2, the total effective focal length f of the camera lens assembly is 1.50 mm, the axial distance TTL from the object-side surface S1 of the first lens E1 to the imaging plane S17 is 7.13 mm, and the maximal field-of-view FOV is 130.0°.

Table 3 shows basic parameters of the camera lens assembly of example 2, where the units for the radius of curvature, the thickness and the focal length are millimeter (mm). Table 4 shows high-order coefficients applicable to each aspheric surface in example 2, where the surface shape of each aspheric surface may be defined by the formula (1) given in the above example 1.

TABLE 3

| Surface number | Surface type | Radius of curvature | Thickness/ Distance | Material Refractive index | Material Abbe number | Focal length | Conic coefficient |
|---|---|---|---|---|---|---|---|
| OBJ | Spherical | Infinite | Infinite | | | | |
| S1 | Aspheric | 2.3459 | 0.1600 | 1.546 | 56.09 | −2.21 | 0.000 |
| S2 | Aspheric | 0.7782 | 0.6325 | | | | −1.000 |
| S3 | Aspheric | 2.2194 | 0.4038 | 1.677 | 19.24 | 3.46 | 0.000 |
| S4 | Aspheric | 40.1538 | 0.1000 | | | | 0.000 |
| S5 | Aspheric | −2.7641 | 0.3288 | 1.537 | 55.71 | −2.48 | 0.000 |
| S6 | Aspheric | 2.6783 | 0.1000 | | | | 0.000 |
| STO | Spherical | Infinite | 0.0100 | | | | |
| S7 | Aspheric | 2.3904 | 0.8677 | 1.546 | 56.09 | 1.32 | 0.000 |
| S8 | Aspheric | −0.8970 | 0.1000 | | | | 0.000 |
| S9 | Aspheric | −0.8226 | 0.1600 | 1.677 | 19.24 | −2.12 | 0.000 |
| S10 | Aspheric | −1.3800 | 0.4020 | | | | 0.000 |
| S11 | Aspheric | 3.5564 | 1.1841 | 1.537 | 55.71 | 2.67 | 0.000 |
| S12 | Aspheric | −2.1248 | 1.5339 | | | | 0.000 |
| S13 | Aspheric | 4.7863 | 0.3000 | 1.537 | 55.71 | 5.31 | 0.000 |
| S14 | Aspheric | −6.8888 | 0.1000 | | | | 0.000 |

TABLE 3-continued

| Surface number | Surface type | Radius of curvature | Thickness/ Distance | Material Refractive index | Abbe number | Focal length | Conic coefficient |
|---|---|---|---|---|---|---|---|
| S15 | Spherical | Infinite | 0.2100 | 1.518 | 64.17 | | |
| S16 | Spherical | Infinite | 0.5400 | | | | |
| S17 | Spherical | Infinite | | | | | |

TABLE 4

| Surface number | A4 | A6 | A8 | A10 | A12 | A14 | A16 |
|---|---|---|---|---|---|---|---|
| S1 | −8.9389E−02 | 1.0335E−02 | −1.3136E−03 | 4.8981E−05 | −3.8928E−06 | −1.8136E−07 | 0.0000E+00 |
| S2 | 1.8036E−01 | 6.1664E−02 | 2.3896E−02 | 1.1781E−02 | 6.4552E−03 | 3.7604E−03 | 2.2542E−03 |
| S3 | −2.7145E−03 | 5.7969E−03 | −2.4092E−03 | 2.0352E−03 | −5.5166E−04 | 3.9542E−05 | 5.1234E−05 |
| S4 | −9.1386E−03 | −3.0177E−04 | −3.8659E−04 | 3.0657E−04 | −1.0117E−04 | 2.1002E−05 | −3.7499E−06 |
| S5 | 4.6874E−02 | −4.3363E−03 | 4.8662E−04 | −3.7678E−04 | 6.9885E−05 | 1.0216E−04 | −5.0373E−05 |
| S6 | 2.1803E−02 | 6.0731E−04 | −3.5597E−04 | −4.3391E−04 | −1.7759E−05 | 8.4747E−05 | 4.9887E−05 |
| S7 | 7.2319E−03 | 5.6731E−03 | −5.4924E−04 | −1.0634E−03 | 3.6416E−04 | 1.9827E−04 | −2.2122E−04 |
| S8 | −6.8025E−02 | −2.4938E−02 | −8.6021E−03 | −5.1081E−03 | −3.3792E−03 | −1.8700E−03 | −9.9577E−04 |
| S9 | −1.7072E−03 | −1.5534E−02 | −7.8748E−03 | 1.5750E−04 | −3.0847E−04 | 6.5457E−05 | 1.4321E−04 |
| S10 | 2.2601E−01 | −3.2581E−02 | 6.4201E−03 | −7.3873E−04 | −1.9304E−04 | 2.9662E−04 | −2.1828E−04 |
| S11 | −1.6443E−01 | 3.3339E−02 | −6.5077E−03 | 2.6473E−03 | −1.0816E−03 | 4.7004E−04 | −1.7182E−04 |
| S12 | −7.5800E−02 | 3.6711E−02 | −2.9672E−04 | 1.6222E−03 | 5.9257E−05 | −8.4432E−05 | 5.6912E−05 |
| S13 | −1.1123E+00 | 8.9195E−02 | 4.7472E−02 | −3.7258E−02 | 1.4505E−02 | −3.8061E−03 | 5.9400E−04 |
| S14 | −1.7150E−01 | −2.3055E−01 | 1.7381E−01 | −8.3420E−02 | 3.3911E−02 | −1.4124E−02 | 6.3665E−03 |

| Surface number | A18 | A20 | A22 | A24 | A26 | A28 | A30 |
|---|---|---|---|---|---|---|---|
| S1 | 0.0000E+00 | 0.0000E+00 | 0.0000E+00 | 0.0000E+00 | 0.0000E+00 | 0.0000E+00 | 0.0000E+00 |
| S2 | 1.3429E−03 | 8.2151E−04 | 4.7942E−04 | 2.8276E−04 | 1.4744E−04 | 7.1463E−05 | 1.3565E−05 |
| S3 | 0.0000E+00 | 0.0000E+00 | 0.0000E+00 | 0.0000E+00 | 0.0000E+00 | 0.0000E+00 | 0.0000E+00 |
| S4 | 0.0000E+00 | 0.0000E+00 | 0.0000E+00 | 0.0000E+00 | 0.0000E+00 | 0.0000E+00 | 0.0000E+00 |
| S5 | 0.0000E+00 | 0.0000E+00 | 0.0000E+00 | 0.0000E+00 | 0.0000E+00 | 0.0000E+00 | 0.0000E+00 |
| S6 | 0.0000E+00 | 0.0000E+00 | 0.0000E+00 | 0.0000E+00 | 0.0000E+00 | 0.0000E+00 | 0.0000E+00 |
| S7 | 6.7577E−05 | 6.7302E−05 | −9.3187E−05 | −1.5147E−05 | 3.7100E−05 | 0.0000E+00 | 0.0000E+00 |
| S8 | −4.8688E−04 | −3.7103E−04 | −2.2147E−04 | −1.1155E−04 | −6.2816E−05 | −3.2743E−05 | −1.2925E−05 |
| S9 | 2.9936E−04 | 8.4668E−06 | −8.8386E−05 | 3.2804E−05 | −6.0908E−08 | 0.0000E+00 | 0.0000E+00 |
| S10 | 9.8076E−05 | −6.1609E−05 | 2.9293E−05 | 1.0426E−05 | −3.8370E−06 | −6.1759E−06 | 2.0515E−07 |
| S11 | 6.7124E−05 | −1.6304E−05 | 7.6619E−06 | −2.7610E−06 | 0.0000E+00 | 0.0000E+00 | 0.0000E+00 |
| S12 | −2.6317E−05 | 1.6724E−05 | −6.7642E−06 | 5.2513E−06 | −1.0637E−06 | 0.0000E+00 | 0.0000E+00 |
| S13 | −1.4880E−04 | −1.1787E−04 | 3.6303E−05 | −6.5087E−05 | 8.5421E−07 | −3.9363E−05 | 0.0000E+00 |
| S14 | −3.0989E−03 | 1.1593E−03 | −2.0506E−04 | −5.1950E−05 | 1.7263E−05 | 0.0000E+00 | 0.0000E+00 |

Figure 4A:
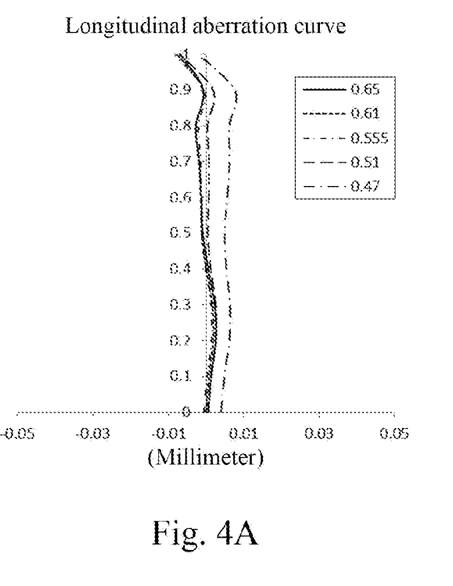
FIGS. 4A to 4D illustrate a longitudinal aberration curve, an astigmatic curve, a distortion curve, and a lateral color curve of the camera lens assembly of Example 2, respectively.
Figure 4B:
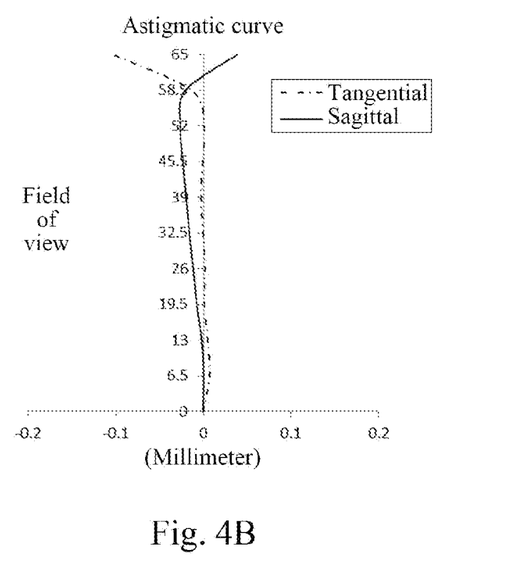
Figure 4C:
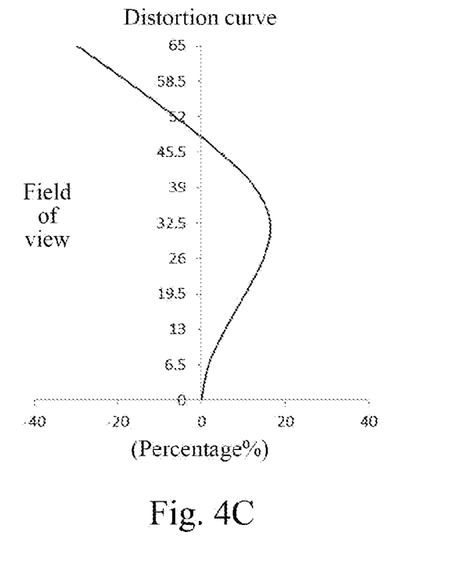
Figure 4D:
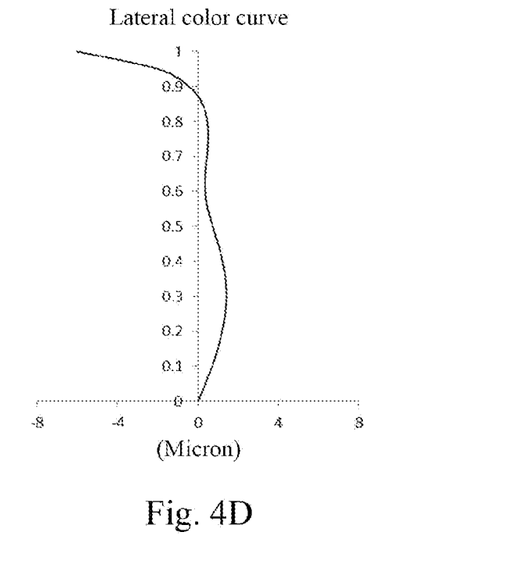

FIG. 4A illustrates a longitudinal aberration curve of the camera lens assembly according to example 2, representing deviations of focal points converged by lights of different wavelengths which pass through the lens assembly. FIG. 4B illustrates an astigmatic curve of the camera lens assembly according to example 2, representing a curvature of a tangential plane and a curvature of a sagittal plane. FIG. 4C illustrates a distortion curve of the camera lens assembly according to example 2, representing amounts of distortion corresponding to different field-of-views. FIG. 4D illustrates a lateral color curve of the camera imaging system according to example 2, representing deviations of different heights of images on an imaging plane formed by light passing through the lens assembly. It can be seen from FIG. 4A to FIG. 4D that the camera lens assembly provided in example 2 may achieve a good imaging quality.

Example 3

Figure 5:
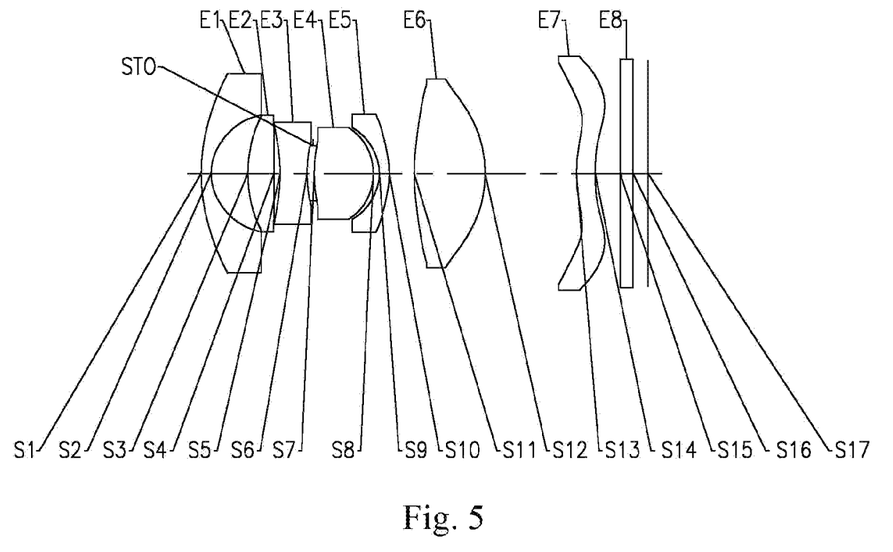
FIG. 5 is a schematic structural diagram showing a camera lens assembly according to Example 3 of the present disclosure.

A camera lens assembly according to example 3 of the present disclosure is described below with reference to FIGS. 5 to 6D. FIG. 5 shows a schematic structural diagram of the camera lens assembly according to example 3 of the present disclosure.

As shown in FIG. 5, the camera lens assembly includes a first lens E1, a second lens E2, a third lens E3, a stop STO, a fourth lens E4, a fifth lens E5, a sixth lens E6, a seventh lens E7, and an optical filter E8, which are sequentially arranged along an optical axis from an object side to an image side of the camera lens assembly.

The first lens E1 has a negative refractive power, and an object-side surface S1 thereof is a convex surface and an image-side surface S2 thereof is a concave surface. The second lens E2 has a positive refractive power, and an object-side surface S3 thereof is a convex surface and an image-side surface S4 thereof is a concave surface. The third lens E3 has a negative refractive power, and an object-side surface S5 thereof is a concave surface and an image-side surface S6 thereof is a concave surface. The fourth lens E4 has a positive refractive power, and an object-side surface S7 thereof is a convex surface and an image-side surface S8 thereof is a convex surface. The fifth lens E5 has a negative refractive power, and an object-side surface S9 thereof is a concave surface and an image-side surface S10 thereof is a convex surface. The sixth lens E6 has a positive refractive power, and an object-side surface S11 thereof is a convex surface and an image-side surface S12 thereof is a convex surface. The seventh lens E7 has a positive refractive power, and an object-side surface S13 thereof is a convex surface and an image-side surface S14 thereof is a concave surface. The optical filter E8 has an object-side surface S15 and an image-side surface S16. The camera lens assembly has an imaging plane S17. Light from an object sequentially passes through the respective surfaces S1 to S16 and is finally imaged on the imaging plane S17.

In example 3, the total effective focal length f of the camera lens assembly is 1.50 mm, the axial distance TTL from the object-side surface S1 of the first lens E1 to the imaging plane S17 is 7.23 mm, and the maximal field-of-view FOV is 130.0°.

Table 5 shows basic parameters of the camera lens assembly of example 3, where the units for the radius of curvature, the thickness and the focal length are millimeter (mm). Table 6 shows high-order coefficients applicable to each aspheric surface in example 3, where the surface shape of each aspheric surface may be defined by the formula (1) given in the above example 1.

TABLE 5

| Surface number | Surface type | Radius of curvature | Thickness/ Distance | Refractive index | Abbe number | Focal length | Conic coefficient |
|---|---|---|---|---|---|---|---|
| OBJ | Spherical | Infinite | Infinite | | | | |
| S1 | Aspheric | 3.1114 | 0.1600 | 1.546 | 56.09 | −2.13 | 0.000 |
| S2 | Aspheric | 0.8314 | 0.5950 | | | | −1.000 |
| S3 | Aspheric | 2.0476 | 0.4248 | 1.677 | 19.24 | 3.03 | 0.000 |
| S4 | Aspheric | 12959.0528 | 0.1000 | | | | 0.000 |
| S5 | Aspheric | −2.4647 | 0.4348 | 1.537 | 55.71 | −2.34 | 0.000 |
| S6 | Aspheric | 2.7232 | 0.1000 | | | | 0.000 |
| STO | Spherical | Infinite | 0.0155 | | | | |
| S7 | Aspheric | 2.5016 | 0.9563 | 1.546 | 56.09 | 1.39 | 0.000 |
| S8 | Aspheric | −0.9455 | 0.1000 | | | | 0.000 |
| S9 | Aspheric | −0.6967 | 0.1600 | 1.677 | 19.24 | −2.26 | −1.000 |
| S10 | Aspheric | −1.4001 | 0.4020 | | | | 0.000 |
| S11 | Aspheric | 3.3981 | 1.1489 | 1.537 | 55.71 | 2.60 | 0.000 |
| S12 | Aspheric | −2.0917 | 1.4789 | | | | 0.000 |
| S13 | Aspheric | 2.6621 | 0.3032 | 1.537 | 55.71 | 9.07 | 0.000 |
| S14 | Aspheric | 5.6443 | 0.4034 | | | | 0.000 |
| S15 | Spherical | Infinite | 0.2100 | 1.518 | 64.17 | | |
| S16 | Spherical | Infinite | 0.2400 | | | | |
| S17 | Spherical | Infinite | | | | | |

TABLE 6

| Surface number | | | | | | | |
|---|---|---|---|---|---|---|---|
| | A4 | A6 | A8 | A10 | A12 | A14 | A16 |
| S1 | −2.6401E−02 | −5.6701E−03 | 2.1183E−03 | −2.4938E−04 | 1.3966E−05 | −3.3916E−07 | 0.0000E+00 |
| S2 | 1.7277E−01 | 5.4028E−02 | 1.9715E−02 | 8.9807E−03 | 4.5094E−03 | 2.4025E−03 | 1.3436E−03 |
| S3 | −1.1818E−02 | 7.0694E−03 | −2.8839E−03 | 2.3722E−03 | −6.0169E−04 | −9.1762E−05 | 1.1055E−04 |
| S4 | −3.0801E−03 | −1.3022E−03 | −2.4398E−04 | 5.4533E−04 | −2.5210E−04 | 2.0799E−05 | 1.1174E−05 |
| S5 | 5.2214E−02 | −5.0236E−03 | 6.3679E−04 | −4.0014E−04 | −3.5943E−05 | 1.9224E−04 | −5.4931E−05 |
| S6 | 2.2613E−02 | 4.2404E−04 | −3.8586E−04 | −3.4678E−04 | 1.2441E−05 | 5.8750E−05 | 2.9897E−05 |
| S7 | 2.2473E−02 | 3.1429E−03 | 6.7702E−05 | −1.1291E−03 | 2.7366E−04 | 3.2019E−04 | −2.9148E−04 |
| S8 | −1.2158E−01 | −5.1556E−02 | −2.9893E−02 | −2.2311E−02 | −1.7242E−02 | −1.2388E−02 | −9.2349E−03 |
| S9 | −1.5088E−02 | −3.0028E−02 | −1.8294E−03 | −7.9975E−05 | −3.4219E−04 | 1.7051E−04 | −1.2734E−04 |
| S10 | 2.2644E−01 | −3.3850E−02 | 6.5749E−03 | −7.3784E−04 | −2.3282E−04 | 2.4961E−04 | −1.7144E−04 |
| S11 | −1.5047E−01 | 2.7120E−02 | −3.7704E−03 | 1.5554E−03 | −6.3648E−04 | 2.7761E−04 | −1.2355E−04 |
| S12 | −3.3150E−02 | 3.1531E−02 | 1.8328E−03 | 1.1493E−03 | 4.2408E−05 | −2.5681E−05 | 2.3585E−05 |
| S13 | −1.2198E+00 | 1.4785E−01 | 2.3756E−02 | −3.6323E−02 | 1.8074E−02 | −3.4956E−03 | −9.8476E−04 |
| S14 | −7.5775E−01 | −1.2115E−01 | 1.2068E−01 | −5.6141E−02 | 2.6390E−02 | −8.2236E−03 | 1.6500E−03 |

| Surface number | | | | | | | |
|---|---|---|---|---|---|---|---|
| | A18 | A20 | A22 | A24 | A26 | A28 | A30 |
| S1 | 0.0000E+00 | 0.0000E+00 | 0.0000E+00 | 0.0000E+00 | 0.0000E+00 | 0.0000E+00 | 0.0000E+00 |
| S2 | 7.5630E−04 | 4.3188E−04 | 2.4333E−04 | 1.3614E−04 | 7.1704E−05 | 3.5672E−05 | 1.1823E−05 |
| S3 | 0.0000E+00 | 0.0000E+00 | 0.0000E+00 | 0.0000E+00 | 0.0000E+00 | 0.0000E+00 | 0.0000E+00 |
| S4 | 0.0000E+00 | 0.0000E+00 | 0.0000E+00 | 0.0000E+00 | 0.0000E+00 | 0.0000E+00 | 0.0000E+00 |
| S5 | 0.0000E+00 | 0.0000E+00 | 0.0000E+00 | 0.0000E+00 | 0.0000E+00 | 0.0000E+00 | 0.0000E+00 |
| S6 | 0.0000E+00 | 0.0000E+00 | 0.0000E+00 | 0.0000E+00 | 0.0000E+00 | 0.0000E+00 | 0.0000E+00 |
| S7 | 4.0675E−05 | 1.2897E−04 | −9.7627E−05 | −3.7269E−05 | 4.0786E−05 | 0.0000E+00 | 0.0000E+00 |

TABLE 6-continued

| S8 | −6.7090E−03 | −4.8665E−03 | −3.2961E−03 | −1.6330E−03 | 0.0000E+00 | 0.0000E+00 | 0.0000E+00 |
| S9 | −2.0006E−05 | 2.5046E−05 | 4.5683E−06 | 1.4250E−06 | 9.5334E−07 | 0.0000E+00 | 0.0000E+00 |
| S10 | 1.1552E−04 | −5.9795E−05 | −2.7617E−06 | 1.4287E−05 | 2.2036E−07 | −5.5568E−07 | −1.7705E−06 |
| S11 | 6.0199E−05 | −1.2529E−05 | 2.2725E−06 | −4.3426E−06 | 0.0000E+00 | 0.0000E+00 | 0.0000E+00 |
| S12 | −2.3960E−05 | 7.2531E−07 | −3.0714E−06 | 3.6861E−06 | −2.6297E−07 | 0.0000E+00 | 0.0000E+00 |
| S13 | 8.8626E−04 | −5.1881E−04 | 7.5988E−05 | −3.2417E−05 | −2.5661E−05 | −5.3085E−05 | 0.0000E+00 |
| S14 | −1.0950E−03 | −4.8943E−04 | 4.6140E−04 | −2.4812E−04 | 2.2445E−04 | 0.0000E+00 | 0.0000E+00 |

Figure 6A:
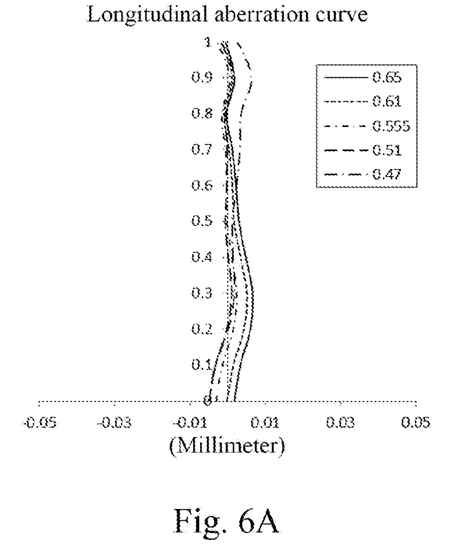
FIGS. 6A to 6D illustrate a longitudinal aberration curve, an astigmatic curve, a distortion curve, and a lateral color curve of the camera lens assembly of Example 3, respectively.
Figure 6B:
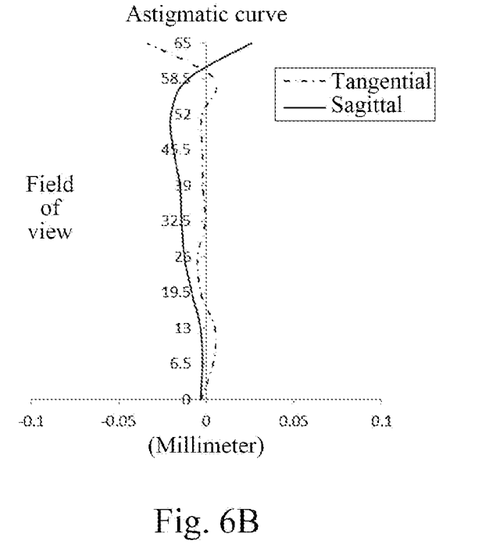
Figure 6C:
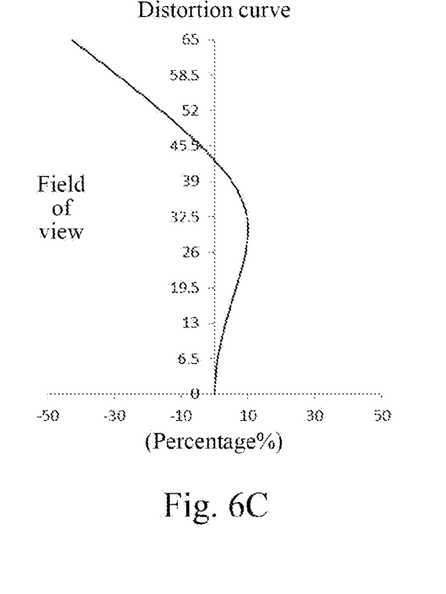
Figure 6D:
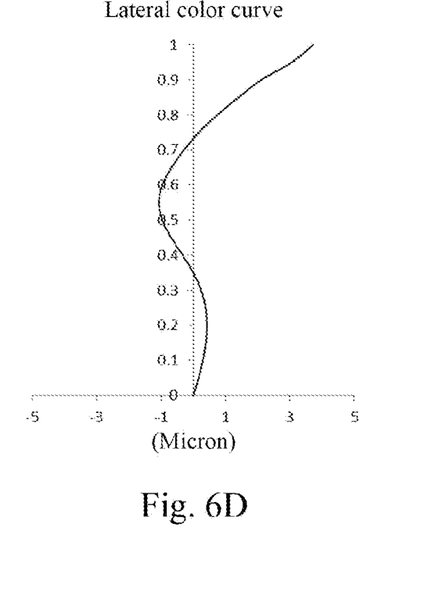

FIG. 6A illustrates a longitudinal aberration curve of the camera lens assembly according to example 3, representing deviations of focal points converged by lights of different wavelengths which pass through the lens assembly. FIG. 6B illustrates an astigmatic curve of the camera lens assembly according to example 3, representing a curvature of a tangential plane and a curvature of a sagittal plane. FIG. 6C illustrates a distortion curve of the camera lens assembly according to example 3, representing amounts of distortion corresponding to different field-of-views. FIG. 6D illustrates a lateral color curve of the camera imaging system according to example 3, representing deviations of different heights of images on an imaging plane formed by light passing through the lens assembly. It can be seen from FIG. 6A to FIG. 6D that the camera lens assembly provided in example 3 may achieve a good imaging quality.

Example 4

Figure 7:
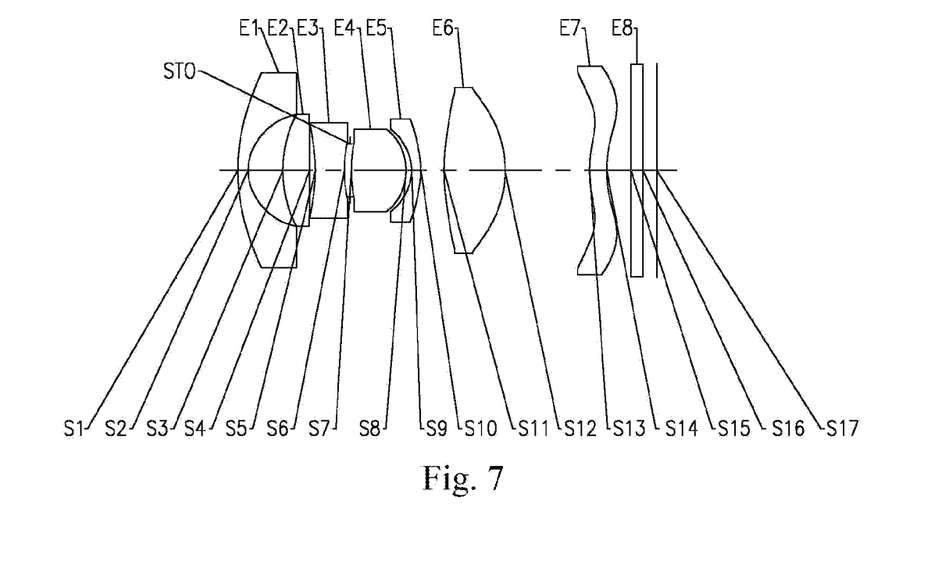
FIG. 7 is a schematic structural diagram showing a camera lens assembly according to Example 4 of the present disclosure.

A camera lens assembly according to example 4 of the present disclosure is described below with reference to FIGS. 7 to 8D. FIG. 7 shows a schematic structural diagram of the camera lens assembly according to example 4 of the present disclosure.

As shown in FIG. 7, the camera lens assembly includes a first lens E1, a second lens E2, a third lens E3, a stop STO, a fourth lens E4, a fifth lens E5, a sixth lens E6, a seventh lens E7, and an optical filter E8, which are sequentially arranged along an optical axis from an object side to an image side of the camera lens assembly.

The first lens E1 has a negative refractive power, and an object-side surface S1 thereof is a convex surface and an image-side surface S2 thereof is a concave surface. The second lens E2 has a positive refractive power, and an object-side surface S3 thereof is a convex surface and an image-side surface S4 thereof is a convex surface. The third lens E3 has a negative refractive power, and an object-side surface S5 thereof is a concave surface and an image-side surface S6 thereof is a concave surface. The fourth lens E4 has a positive refractive power, and an object-side surface S7 thereof is a convex surface and an image-side surface S8 thereof is a convex surface. The fifth lens E5 has a negative refractive power, and an object-side surface S9 thereof is a concave surface and an image-side surface S10 thereof is a convex surface. The sixth lens E6 has a positive refractive power, and an object-side surface S11 thereof is a convex surface and an image-side surface S12 thereof is a convex surface. The seventh lens E7 has a positive refractive power, and an object-side surface S13 thereof is a convex surface and an image-side surface S14 thereof is a concave surface. The optical filter E8 has an object-side surface S15 and an image-side surface S16. The camera lens assembly has an imaging plane S17. Light from an object sequentially passes through the respective surfaces S1 to S16 and is finally imaged on the imaging plane S17.

In example 4, the total effective focal length f of the camera lens assembly is 1.50 mm, the axial distance TTL from the object-side surface S1 of the first lens E1 to the imaging plane S17 is 7.30 mm, and the maximal field-of-view FOV is 130.0°.

Table 7 shows basic parameters of the camera lens assembly of example 4, where the units for the radius of curvature, the thickness and the focal length are millimeter (mm). Table 8 shows high-order coefficients applicable to each aspheric surface in example 4, where the surface shape of each aspheric surface may be defined by the formula (1) given in the above example 1.

TABLE 7

| Surface number | Surface type | Radius of curvature | Thickness/ Distance | Material Refractive index | Abbe number | Focal length | Conic coefficient |
| --- | --- | --- | --- | --- | --- | --- | --- |
| OBJ | Spherical | Infinite | Infinite | | | | |
| S1 | Aspheric | 3.5706 | 0.1783 | 1.546 | 56.09 | −2.08 | 0.000 |
| S2 | Aspheric | 0.8460 | 0.6072 | | | | −1.000 |
| S3 | Aspheric | 2.0707 | 0.4679 | 1.677 | 19.24 | 2.93 | 0.000 |
| S4 | Aspheric | −44.3675 | 0.1000 | | | | 0.000 |
| S5 | Aspheric | −2.3227 | 0.5029 | 1.537 | 55.71 | −2.23 | 0.000 |
| S6 | Aspheric | 2.6590 | 0.1013 | | | | 0.000 |
| STO | Spherical | Infinite | 0.0191 | | | | |
| S7 | Aspheric | 2.4036 | 0.9544 | 1.546 | 56.09 | 1.42 | 0.000 |
| S8 | Aspheric | −0.9794 | 0.1000 | | | | 0.000 |
| S9 | Aspheric | −0.7048 | 0.1600 | 1.677 | 19.24 | −2.35 | −1.000 |
| S10 | Aspheric | −1.3838 | 0.4020 | | | | 0.000 |
| S11 | Aspheric | 3.3650 | 1.0640 | 1.537 | 55.71 | 2.55 | 0.000 |
| S12 | Aspheric | −2.0505 | 1.4711 | | | | 0.000 |
| S13 | Aspheric | 2.3752 | 0.3000 | 1.537 | 55.71 | 20.82 | 0.000 |

TABLE 7-continued

| Surface number | Surface type | Radius of curvature | Thickness/ Distance | Material Refractive index | Abbe number | Focal length | Conic coefficient |
|---|---|---|---|---|---|---|---|
| S14 | Aspheric | 2.8833 | 0.4215 | | | | 0.000 |
| S15 | Spherical | Infinite | 0.2100 | 1.518 | 64.17 | | |
| S16 | Spherical | Infinite | 0.2403 | | | | |
| S17 | Spherical | Infinite | | | | | |

TABLE 8

| | Surface number | | | | | | |
|---|---|---|---|---|---|---|---|
| | A4 | A6 | A8 | A10 | A12 | A14 | A16 |
| S1 | −1.2750E−02 | −8.6060E−03 | 3.3094E−03 | −4.3096E−04 | 2.7162E−05 | −7.6093E−07 | 5.9187E−09 |
| S2 | 1.4427E−01 | 3.5294E−02 | 1.1143E−02 | 4.1424E−03 | 1.6540E−03 | 6.8999E−04 | 3.1816E−04 |
| S3 | −2.0986E−02 | 8.3454E−03 | −3.2667E−03 | 2.3027E−03 | −3.2603E−04 | −1.8594E−04 | 7.9715E−05 |
| S4 | 2.5453E−03 | −2.7109E−03 | −4.9800E−05 | 4.1901E−04 | −1.1194E−04 | −2.6143E−05 | 3.3714E−06 |
| S5 | 7.0115E−02 | −7.5265E−03 | 1.4730E−03 | −5.7248E−04 | −1.2594E−04 | 1.3676E−04 | 1.9456E−05 |
| S6 | 2.4263E−02 | 3.4188E−04 | −3.0746E−04 | −3.9342E−04 | −1.7263E−05 | 5.9517E−05 | 4.7509E−05 |
| S7 | 2.1410E−02 | 3.5091E−03 | 3.8895E−05 | −1.0931E−03 | 2.2197E−04 | 3.4723E−04 | −2.7135E−04 |
| S8 | −9.2174E−02 | −2.5837E−02 | −7.8557E−03 | −4.8687E−03 | −3.1054E−03 | −1.4071E−03 | −6.2302E−04 |
| S9 | 5.6312E−03 | −2.9347E−02 | −2.7150E−04 | −2.7376E−04 | 2.7746E−05 | −9.5624E−06 | 1.4851E−05 |
| S10 | 2.4328E−01 | −3.6897E−02 | 8.3752E−03 | −1.5186E−03 | 9.9894E−05 | −7.0281E−05 | 9.9706E−05 |
| S11 | −1.4508E−01 | 2.4107E−02 | −2.0864E−03 | 6.0413E−04 | −6.7836E−05 | −8.7491E−05 | 4.7527E−05 |
| S12 | −5.6619E−03 | 2.8518E−02 | 3.4417E−03 | 4.4625E−04 | 2.8657E−04 | −8.6552E−05 | 1.3212E−05 |
| S13 | −1.3241E+00 | 1.6139E−01 | 1.0272E−02 | −3.2357E−02 | 1.7607E−02 | −5.8312E−03 | 8.5665E−04 |
| S14 | −1.1981E+00 | 3.6449E−03 | 7.6150E−02 | −4.3557E−02 | 2.4116E−02 | −1.1745E−02 | 4.7292E−03 |

| | Surface number | | | | | | |
|---|---|---|---|---|---|---|---|
| | A18 | A20 | A22 | A24 | A26 | A28 | A30 |
| S1 | 0.0000E+00 | 0.0000E+00 | 0.0000E+00 | 0.0000E+00 | 0.0000E+00 | 0.0000E+00 | 0.0000E+00 |
| S2 | 1.4583E−04 | 6.7963E−05 | 3.1940E−05 | 1.4932E−05 | 6.8737E−06 | 3.0411E−06 | 1.1018E−06 |
| S3 | 0.0000E+00 | 0.0000E+00 | 0.0000E+00 | 0.0000E+00 | 0.0000E+00 | 0.0000E+00 | 0.0000E+00 |
| S4 | 0.0000E+00 | 0.0000E+00 | 0.0000E+00 | 0.0000E+00 | 0.0000E+00 | 0.0000E+00 | 0.0000E+00 |
| S5 | 0.0000E+00 | 0.0000E+00 | 0.0000E+00 | 0.0000E+00 | 0.0000E+00 | 0.0000E+00 | 0.0000E+00 |
| S6 | 0.0000E+00 | 0.0000E+00 | 0.0000E+00 | 0.0000E+00 | 0.0000E+00 | 0.0000E+00 | 0.0000E+00 |
| S7 | −4.3878E−06 | 1.4054E−04 | −6.9589E−05 | −3.3262E−05 | 2.3176E−05 | 0.0000E+00 | 0.0000E+00 |
| S8 | −3.0679E−04 | −1.8436E−04 | −1.4015E−04 | −4.8804E−05 | 0.0000E+00 | 0.0000E+00 | 0.0000E+00 |
| S9 | −3.1699E−05 | 1.0594E−05 | 2.6856E−06 | 5.1883E−07 | 2.3888E−06 | 0.0000E+00 | 0.0000E+00 |
| S10 | 1.9552E−05 | 2.0376E−06 | −4.1684E−05 | −7.6421E−06 | −1.8784E−06 | 5.9139E−06 | 5.8089E−06 |
| S11 | −1.8117E−05 | 2.2217E−05 | −6.2124E−06 | 5.2685E−06 | 0.0000E+00 | 0.0000E+00 | 0.0000E+00 |
| S12 | −1.9527E−05 | 5.9831E−06 | 3.3528E−06 | 3.8214E−06 | −1.9209E−07 | 0.0000E+00 | 0.0000E+00 |
| S13 | 8.5139E−04 | −4.0779E−04 | 9.3891E−05 | −1.4450E−04 | −1.1091E−04 | −1.5784E−05 | 0.0000E+00 |
| S14 | −1.7646E−03 | −1.9669E−04 | 7.8280E−05 | −1.9052E−04 | 2.6762E−04 | 0.0000E+00 | 0.0000E+00 |

Figure 8A:
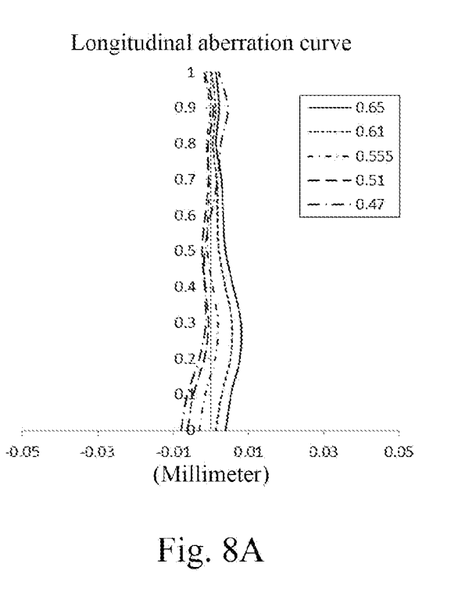
FIGS. 8A to 8D illustrate a longitudinal aberration curve, an astigmatic curve, a distortion curve, and a lateral color curve of the camera lens assembly of Example 4, respectively.
Figure 8B:
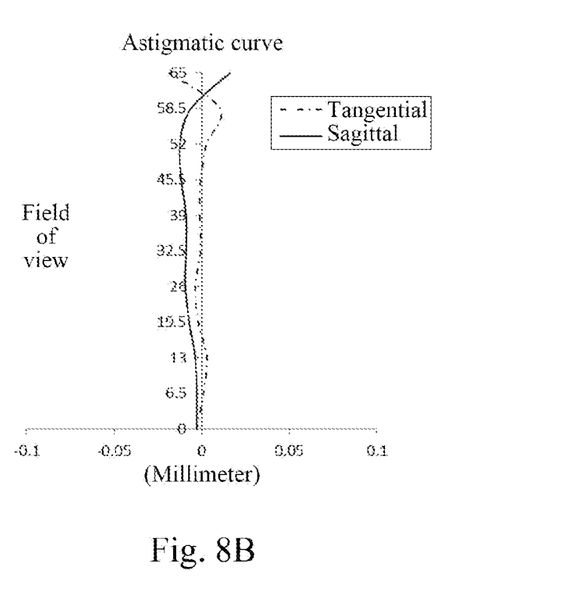
Figure 8C:
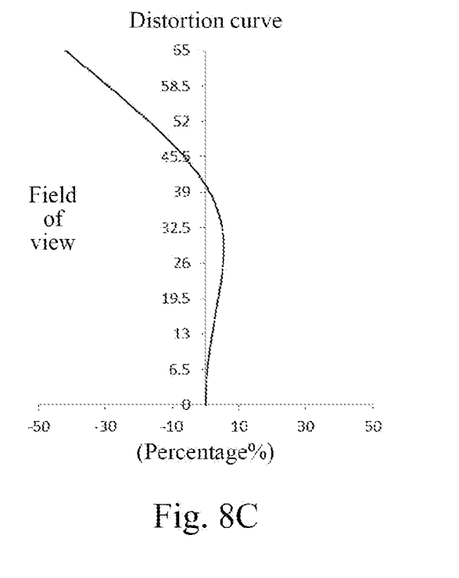
Figure 8D:
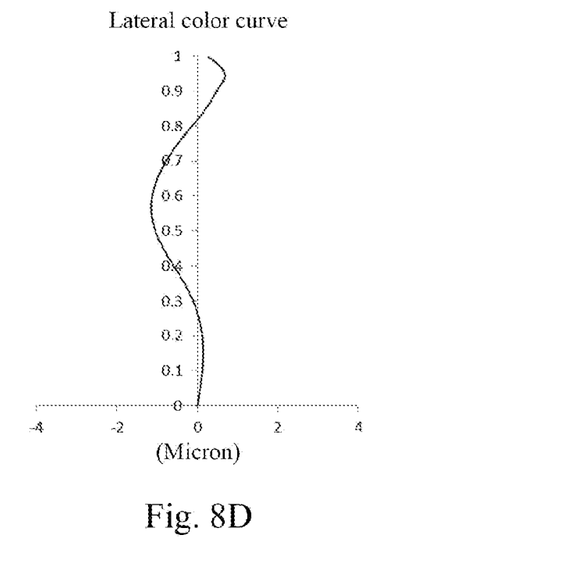

FIG. 8A illustrates a longitudinal aberration curve of the camera lens assembly according to example 4, representing deviations of focal points converged by lights of different wavelengths which pass through the lens assembly. FIG. 8B illustrates an astigmatic curve of the camera lens assembly according to example 4, representing a curvature of a tangential plane and a curvature of a sagittal plane. FIG. 8C illustrates a distortion curve of the camera lens assembly according to example 4, representing amounts of distortion corresponding to different field-of-views. FIG. 8D illustrates a lateral color curve of the camera imaging system according to example 4, representing deviations of different heights of images on an imaging plane formed by light passing through the lens assembly. It can be seen from FIG. 8A to FIG. 8D that the camera lens assembly provided in example 4 may achieve a good imaging quality.

Examples 1 to 4 respectively satisfy the relationship shown in Table 9.

TABLE 9

| | Example | | | |
|---|---|---|---|---|
| Conditional | 1 | 2 | 3 | 4 |
| TTL/tan(FOV/3) | 7.49 | 7.56 | 7.67 | 7.74 |
| f3/f | −1.90 | −1.66 | −1.56 | −1.49 |
| f/f4 | 1.14 | 1.14 | 1.08 | 1.06 |
| f6/f4 | 1.93 | 2.03 | 1.87 | 1.80 |
| f3/f1 | 1.18 | 1.12 | 1.10 | 1.07 |
| f/T67 | 0.95 | 0.98 | 1.01 | 1.02 |
| CT6/CT4 | 1.22 | 1.36 | 1.20 | 1.11 |
| (R11 + R12)/CT6 | 1.37 | 1.21 | 1.14 | 1.24 |
| f5/(R9 − R10) | −3.09 | −3.80 | −3.21 | −3.45 |
| f2/(R3 − R2) | 2.54 | 2.40 | 2.49 | 2.40 |
| f/(R1 − R2) | 1.02 | 0.96 | 0.66 | 0.55 |
| R5/R6 | −0.95 | −1.03 | −0.91 | −0.87 |
| f/R8 | −1.68 | −1.67 | −1.59 | −1.53 |
| Tsi/ImgH | 1.81 | 2.16 | 2.82 | 2.74 |

The present disclosure further provides a camera apparatus whose electronic photosensitive element may be a photosensitive charge-coupled device (CCD) or a complementary metal-oxide semiconductor (CMOS) element. The camera apparatus may be an independent camera device such as a digital camera, or may be a camera module integrated in a mobile electronic device such as a mobile phone. The camera apparatus is equipped with the camera lens assembly described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. A camera lens assembly, sequentially from an object side to an image side along an optical axis, comprising:
    a first lens having a negative refractive power and a convex object-side surface;
    a second lens having a positive refractive power;
    a third lens;
    a fourth lens having a positive refractive power;
    a fifth lens having a negative refractive power;
    a sixth lens having a positive refractive power; and
    a seventh lens,
    wherein an axial distance TTL from the object-side surface of the first lens to an imaging plane of the camera lens assembly and a maximal field-of-view FOV of the camera lens assembly satisfy: 7.0 mm<TTL/Tan(FOV/3)<8.0 mm; and
    an effective focal length f3 of the third lens and a total effective focal length f of the camera lens assembly satisfy: −2.0<f3/f<−1.0.

2. The camera lens assembly according to claim 1, wherein the total effective focal length f of the camera lens assembly and an effective focal length f4 of the fourth lens satisfy: 1≤f/f4<1.5.

3. The camera lens assembly according to claim 1, wherein an effective focal length f6 of the sixth lens and an effective focal length f4 of the fourth lens satisfy: 1.5<f6/f4<2.5.

4. The camera lens assembly according to claim 1, wherein the effective focal length f3 of the third lens and an effective focal length f1 of the first lens satisfy: 1.0<f3/f1<1.5.

5. The camera lens assembly according to claim 1, wherein the total effective focal length f of the camera lens assembly and a spaced interval T67 between the sixth lens and the seventh lens on the optical axis satisfy: 0.9<f/T67<1.2.

6. The camera lens assembly according to claim 1, wherein an axial center thickness CT6 of the sixth lens and an axial center thickness CT4 of the fourth lens satisfy: 1.0<CT6/CT4<1.5.

7. The camera lens assembly according to claim 1, wherein a radius of curvature R11 of an object-side surface of the sixth lens, a radius of curvature R12 of an image-side surface of the sixth lens and an axial center thickness CT6 of the sixth lens satisfy: 1<(R11+R12)/CT6<1.5.

8. The camera lens assembly according to claim 1, wherein an effective focal length f5 of the fifth lens, a radius of curvature R9 of an object-side surface of the fifth lens and a radius of curvature R10 of an image-side surface of the fifth lens satisfy: −4.0<f5/(R9−R10)<−3.0.

9. The camera lens assembly according to claim 1, wherein an effective focal length f2 of the second lens, a radius of curvature R3 of an object-side surface of the second lens and a radius of curvature R2 of an image-side surface of the first lens satisfy: 2.0<f2/(R3−R2)<3.0.

10. The camera lens assembly according to claim 1, wherein the total effective focal length f of the camera lens assembly, a radius of curvature R1 of the object-side surface of the first lens and a radius of curvature R2 of an image-side surface of the first lens satisfy: 0.5≤f/(R1−R2)<1.1.

11. The camera lens assembly according to claim 1, wherein a radius of curvature R5 of an object-side surface of the third lens and a radius of curvature R6 of an image-side surface of the third lens satisfy: −1.5<R5/R6<−0.5.

12. The camera lens assembly according to claim 1, wherein the total effective focal length f of the camera lens assembly and a radius of curvature R8 of an image-side surface of the fourth lens satisfy: −2.0<f/R8≤−1.5.

13. The camera lens assembly according to claim 1, wherein the camera lens assembly further comprises a stop, and an axial distance Tsi from the stop to the imaging plane of the camera lens assembly and a half of a diagonal length ImgH of an effective pixel area on the imaging plane satisfy: 1.5<Tsi/ImgH<3.0.

14. A camera lens assembly, sequentially from an object side to an image side along an optical axis, comprising:
    a first lens having a negative refractive power and a convex object-side surface;
    a second lens having a positive refractive power;
    a third lens;
    a fourth lens having a positive refractive power;
    a fifth lens having a negative refractive power;
    a sixth lens having a positive refractive power; and
    a seventh lens,
    wherein an axial distance TTL from the object-side surface of the first lens to an imaging plane of the camera lens assembly and a maximal field-of-view FOV of the camera lens assembly satisfy: 7.0 mm<TTL/Tan(FOV/3)<8.0 mm; and
    an effective focal length f2 of the second lens, a radius of curvature R3 of an object-side surface of the second lens and a radius of curvature R2 of an image-side surface of the first lens satisfy: 2.0<f2/(R3−R2)<3.0.

* * * * *